June 12, 1956 J. R. JOYCE 2,750,169
VORTEX APPARATUS FOR LIQUID AND GAS
Filed Nov. 10, 1953 2 Sheets-Sheet 1

INVENTOR:
JOHN RUSKIN JOYCE
BY: *Oswald H. Milmore*
HIS ATTORNEY

June 12, 1956  J. R. JOYCE  2,750,169
VORTEX APPARATUS FOR LIQUID AND GAS
Filed Nov. 10, 1953  2 Sheets-Sheet 2

INVENTOR:
JOHN RUSKIN JOYCE
BY: Oswald H. Milmore
HIS ATTORNEY

United States Patent Office 2,750,169
Patented June 12, 1956

2,750,169
VORTEX APPARATUS FOR LIQUID AND GAS

John Ruskin Joyce, Thornton-le-Moors, England, assignor to Shell Development Company, Emeryville, Calif., a corporation of Delaware Application November 10, 1953, Serial No. 391,156

Claims priority, application Great Britain November 27, 1952

8 Claims. (Cl. 261—49)

This invention relates to apparatus for mixing a liquid and a gas by spraying the liquid into a stream of gas in the general direction of gas flow. Such apparatus is hereinafter referred to as "apparatus of the type specified." The invention is particularly but not exclusively applicable to the construction of liquid fuel burners.

In known apparatus of the type specified, the location of the zone wherein the liquid and the gas mix, the rate of mixing, and the degree of dispersion of the liquid in the gas, all of which are considered to contribute to the "quality of the mixing" as the expression is used herein, tend to vary with the rate of fluid flow. Thus, at increasing rates of fluid flow the location of the mixing zone tends to recede in the direction of fluid flow from the point at which both air and liquid are first present in the fluid flow, and the rate of mixing and the degree of liquid dispersion tend to decrease, and vice versa. Hence known apparatus designed to give certain qualities of fluid mixing at a given rate of fluid flow fail to give these qualities of mixing at higher or lower rates of fluid flow. In other words, it is difficult to design known apparatus of the type specified, in which the quality of mixing is maintained over a range of flow rates.

The maintenance of a given quality of mixing is particularly important when the apparatus is a liquid fuel burner in which complete combustion and flame stabilization in a definite zone over a range of fuel feed rates are required. In the specification of my prior patent application, Serial No. 320,083, filed November 12, 1952, I have described a liquid fuel burner in which the fuel flow rate is varied in such a manner as to minimize the variation of the angle of the spray cone in which the liquid fuel enters the air stream, and the importance of maintaining this angle as nearly constant as possible is discussed.

In the said prior application, the fuel spray cone angle variation is minimized by having the ports or portions thereof through which fuel reaches a vortex chamber and which are successively opened as a valve device moves from its minimum to its maximum fuel flow position, arranged tangentially to circles of successively increasing radii.

From one aspect, the present invention is an improvement in or modification of the burner described and claimed in the said prior application, Serial No. 320,083, and has for its object the provision of alternative means whereby, as the valve device moves from its minimum to its maximum fuel flow position, the ports or portions thereof are arranged tangentially to circles of successively increasing radii.

Another object of the present invention is to provide, in apparatus of the type specified, means for reducing the variations in the direction of gas flow with varying rates of gas flow and generally to maintain the quality of mixing substantially independent of the rates of fluid flow.

According to the present invention, in apparatus of the type specified, either the liquid or the gas or both flow through control means which impart to the flowing fluid or fluids, with increasing rate of flow, a direction of flow which is tangential to circles of increasing radii in a plane or planes at right angles to the general direction of fluid flow.

According to the present invention there is, moreover, provided a burner as described and claimed in the said prior application, Serial No. 320,083, which is improved or modified by arranging the valve device to rotate in relation to the burner and about an axis parallel to the general direction of fluid flow in order to insure that, as the valve device moves from its minimum to its maximum fuel flow position, the ports, or portions thereof, are arranged tangentially to circles of successively increasing radii.

In preferred apparatus of the type specified, the construction and operation of the control means is similar in the case of the gas flow control and the liquid flow control.

Apparatus of the type specified according to the present invention may also have control means as defined above for controlling the gas flow and control means as described in the specification of copending application, Serial No. 391,155 filed concurrently herewith for controlling the liquid flow or vice versa. In the case of burners, the liquid flow may also be controlled by any known type of burner construction or by the burner construction described in the said prior application, Serial No. 320,083.

The invention is illustrated by way of example by the accompanying drawings in which.

Figure 1:
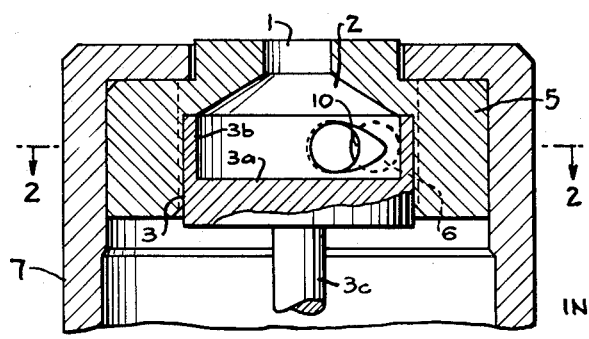
Figure 1 is a diagrammatic longitudinal section through a burner according to the present invention, taken on the line 1—1 of Figure 2.
Figure 2:
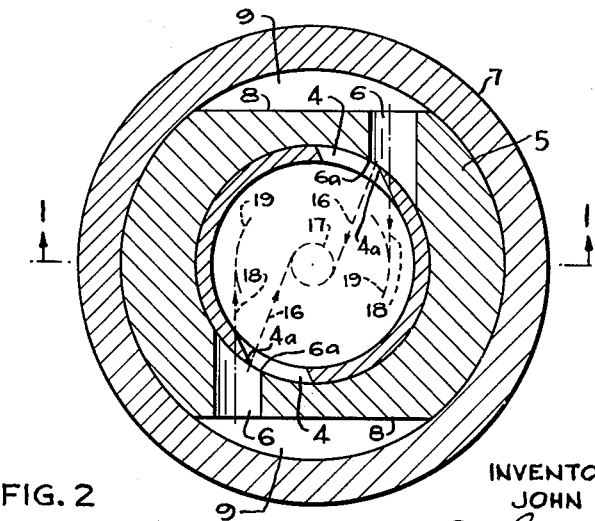
Figure 2 is a transverse section on the line 2—2 of Figure 1.

The burner or atomizer shown in Figures 1 and 2 comprises a hollow tubular casing 7 in the end of which there is fixed a combined swirl sleeve and orifice plate 5 having a recess of circular cross section and a central outlet orifice 1. (The combined sleeve and plate shown may be replaced by a separate sleeve and plate without departing from the scope of the present invention.) A valve device 3 with a back wall 3a and side walls 3b of hollow cylindrical form is accommodated within the said recess of the swirl sleeve 5 and is provided with a spindle 3c by means of which it may be rotated in relation to the swirl sleeve 5 to control fuel flow. A vortex chamber is defined by a frusto-conical wall 2 formed in the sleeve 5 and by the cylindrical hollow interior of the valve device 3. The valve device 3 and the swirl sleeve 5 are secured within the body 7 by means not shown.

The general direction of fluid flow is upwards as shown in Figure 1 or upwardly at right angles to the plane of the paper in Figure 2.

As may be more easily seen in Figure 2, the swirl sleeve 5 is provided with two bores 6 which are substantially parallel to, and offset from, each other and have their axes in a common plane at right angles to the general direction of fluid flow. In the preferred arrangement shown these bores are substantially tangential to the inner surface of wall 3b; stated more precisely, their axes are tangential to a circle 19, in a plane at right angles to the axis of the vortex chamber having a diameter smaller than that of the surface of wall 3b by the diameter of the bore 6. The walls 3b of the valve device are provided with two bores or ports 4 which are of the same diameter and of the same orientation with respect to each other and the general direction of fluid flow as the bores 6. The thickness of the wall 3b is small in relation to the width of the ports 4, measured circumferentially with respect to the wall. The wall 3b is externally smooth and has a close rotational fit in the sleeve 5, as nearly liquidtight as practicable. The sleeve 5 has flat faces 8 that may be perpendicular to the axes of the bores 6 to provide channels 9 for the flow of fluid.

It will be appreciated from Figure 2 that the valve device 3 may easily be turned in relation to the sleeve 5, to a position in which there is no communication between the bores 6 and the vortex chamber. In this position fuel flow is cut off. As the valve device 3 is turned in the clockwise direction as viewed in Figure 2, the position illustrated is reached, which is the position of minimum fuel flow. In this position, fuel reaches the vortex chamber from the channels 9 through narrow orifices 10 of double ogival form, each bounded by one edge 6a of a bore 6 and one edge 4a of a bore 4. Fuel will flow through these orifices in directions substantially as indicated by the broken lines 16 which are tangential to a circle 17 of relatively small radius in a plane at right angles to the general direction of fluid flow.

As the valve device 3 continues to turn in the clockwise direction, the position will be reached in which each port 4 is in complete register with the corresponding bore 6 and represents an extension thereof. In this position, the direction of flow into the vortex chamber is represented by the broken lines 18. It will be seen from Figure 2 that the lines 18 are tangential to a circle 19, in a plane at right angles to the general direction of fluid flow, of much greater radius than the circle 17. In other words, fluid now enters the vortex chamber substantially tangential thereto. It is evident that the fluid enters with greater angular momentum as the total flow rate increases; this leads to reduced variations in the angle of the spray cone that emerges from the orifice 1 for variations in the rate of fluid flow.

Intermediate positions of the valve device 3 between those described above will result in fuel flow into the vortex chamber tangential to circles of radii intermediate between the circles 17 and 19.

Although the bores 4 in the valve device 3 have been shown in a preferred embodiment, offset in the same way as the bores 6, i. e., tangential to the circle 19, it is to be understood that this is not an essential feature of the invention and that simple radial bores in the valve wall 3b would achieve substantially the same result. This is particularly the case when the thickness of the cylindrical wall 3b is small in relation to the diameter of the bore 4.

In the foregoing description of Figures 1 and 2, the valve device 3 and the swirl sleeve 5 constitute control means for controlling the flow of fuel.

It will be noted that about 60° rotation of the valve device 3 will suffice to give all positions of the ports 4 from the fuel cut-off position to maximum fuel flow position and that stops (not shown) may be provided to limit accordingly the angular movement of the valve device 3. It will be appreciated that the bores 6 and ports 4 may be increased in number beyond two; they should, however, be arranged symmetrically about the longitudinal axis of the vortex chamber or as oppositely disposed pairs as shown in Figure 2.

An important advantage possessed by the burner according to the present invention is the maintenance of a constant volume vortex chamber at all rates of fuel flow. The constant volume of the vortex chamber assists in maintaining smooth fuel flow from the outlet orifice 1 and also in diminishing spray cone angle variation with variations in the rate of fuel flow.

Figure 3:
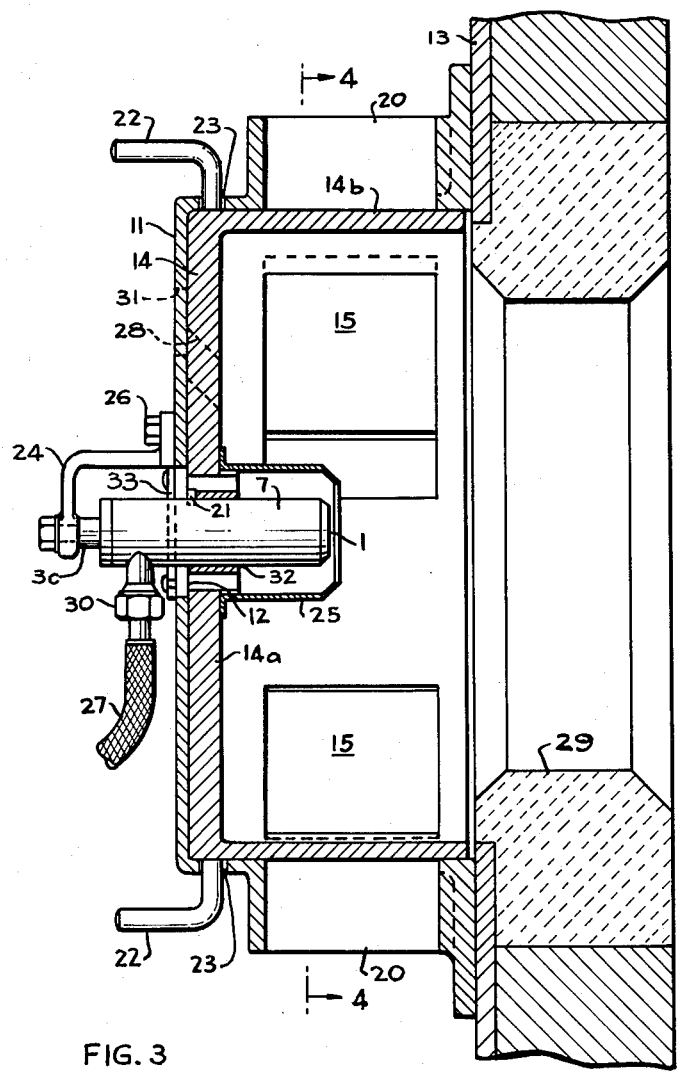
Figure 3 is a longitudinal section through a burner installation in which air flow is controlled by control means of construction and operation similar to the fuel flow control means shown in Figures 1 and 2.
Figure 4:
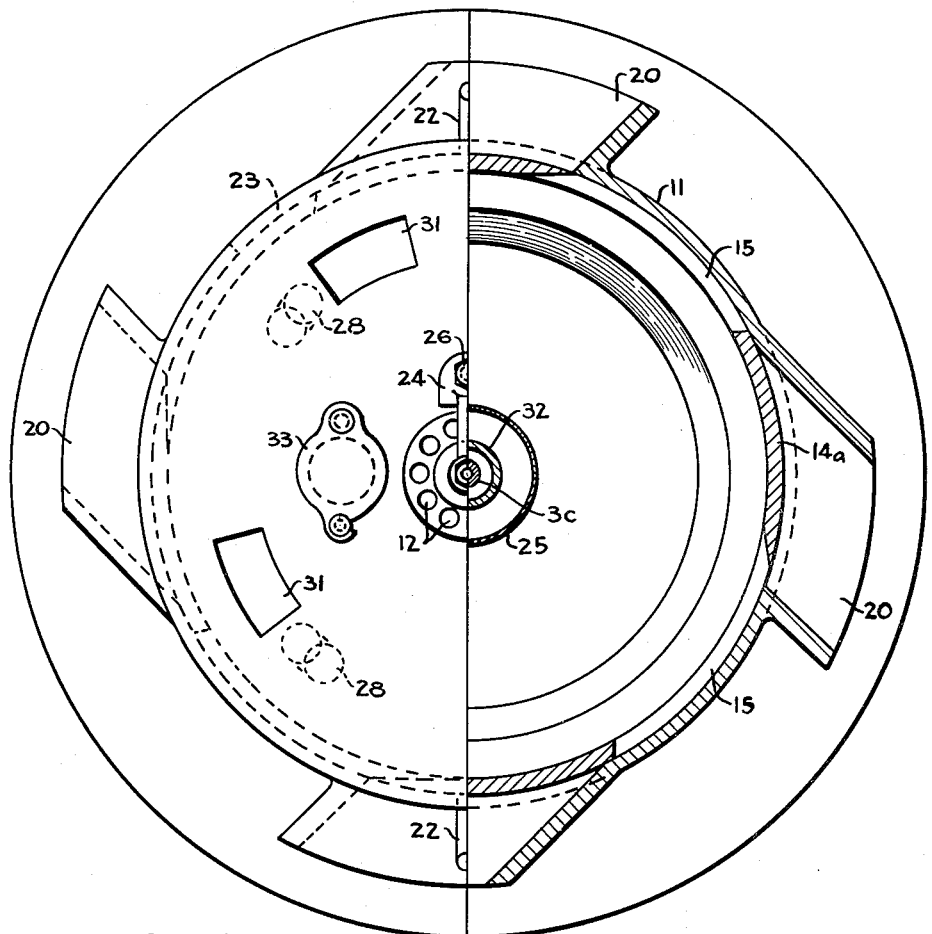
Figure 4 is a part end elevation and a part section, the section being on the line 4—4 of Figure 3.

Turning now to Figures 3 and 4, a burner as shown in Figures 1 and 2 and having a casing 7 is supported by, and coaxially within, a valve device 14 having a back wall 14a and side walls 14b of hollow cylindrical form. The wall 14a carries a support sleeve 32 within which the burner is secured against rotation by a key 21. A shroud member 25, fixed to the wall 14b, surrounds the burner casing 7 and is supplied with air by a number of air admission ports 12 which surround the sleeve 32 and burner 6 (see Figure 4); this arrangement provides an air supply around and near to the root of the fuel spray cone that issues from the orifice 1 and helps in keeping the burner face free from combustion deposits. The valve member 14 is carried by, and rotatable in relation to, a casing 11 which is rigidly secured to a plate 13, which may be the front plate of a furnace or boiler, and thus fits over the fire-brick firing ring 29 of the furnace or boiler.

Oil reaches the burner casing 7 through a flexible pipe 27 which is secured to the burner casing by a pipe union 30.

The valve device 14, which corresponds to the valve device 3 of Figures 1 and 2, is provided in the wall 14b thereof with four ports or apertures 15 arranged symmetrically about its centre as shown in Figure 4. The thickness of the wall 14b is small in relation to the width of the port 14, measured circumferentially about the wall. The casing 11, which corresponds to the swirl sleeve 5 of Figures 1 and 2, is provided with four symmetrically disposed tangential bores or ports 20, which are advantageously elongated in the directions of their axes. The ports 20 and ports 15 function in cooperation in the same way as the bores 6 and 4, respectively.

Control levers 22, fixed to the valve device 14, project through slots 23 in the casing 11.

The spindle 3c of the valve member 3 of the burner casing 7 is rigidly secured to a bracket 24 fixed to the casing 11 by a nut 26 so that when the valve device 14 is turned, by the control handles 22, in relation to the casing 11, the valve device 3 and the swirl plate 5 are simultaneously turned in relation to each other. By means of the arrangement described the valve device 14 may be rotated by the control levers 22 to a limited extent in relation to the casing 11 in a counter-clockwise direction as viewed in Figure 4, thus bringing the apertures 15 into complete register with the bores 20 to give maximum air flow, or to close the bores 20. During this movement, the burner casing 7 is constrained by the key 21 to turn with the valve device 14 and is free to do so by reason of the flexible pipe 27, while the valve device 3 remains stationary as a result of its connection with the bracket 24. In view of the description of the control of fuel flow in connection with Figures 1 and 2, the manner of control of the air flow does not require further detailed description. In brief, the edges of the ports 15 cooperate with the edges of the ports 20 to direct the air in a direction nearer the perimeter of the chamber within the wall 14b as these ports are moved more fully into register to increase the rate of air flow, thereby imparting a greater angular momentum to the air at increasing flow rates. Furthermore, by reason of the connection provided by the bracket 24, it is possible to control air- and fuel-flow over the whole range of flow rates by a single control movement and to insure that, at all flow rates, the quantity of air is stoichiometrically equivalent to the quantity of fuel and that the minimum variation in the quality of mixing of air and fuel takes place. The control of the furnace firing is thus greatly simplified and is easily adapted for operation by remote control, for example by mechanical, electrical or hydraulic means.

With regard to Figures 3 and 4, the valve device 14 and the casing 11 constitute control means for controlling the flow of air.

Unless the casing 11 and the valve device 14 are extended in the axial direction to a degree which is mechanically inconvenient, it is sometimes found that the peripheral location of, and manner of cooperation between, the bores 20 and apertures 15 limit the amount of air available to an undesirable extent. For this reason, additional control of air flow is provided by means of oblique ports 28 formed in the valve device 14 and cooperating slots 31 formed in the casing 11. The ports 28 and slots 31 function as described in said copending application, Serial No. 391,155, when relative rotation of the valve device 14 and the casing 11 takes place.

It will be noted that removal of the burner casing 7 involves only the disconnection of the pipe union 30 and unscrewing of the bracket-retaining nut 26. The replacement burner, provided that it has previously been assembled with a spare bracket 24 in correct relationship to the spindle 3c, is automatically secured in the correct position in relation to the valve device 14 by reason of the keying together of these two components by the key 21.

As alternative construction, the air admission ports 12 may be omitted, together with the shroud 25, or these ports 12 may be arranged obliquely in the same way as the ports 28, and cooperate with arcuate slots in the casing 11. The ports 28 and slots 31 may also be increased in numbers beyond those shown in Figure 4 or they may be omitted. A lighting or inspection hole, normally closed by a pivoted cover 33 may be provided in the casing 11 and back wall 14a.

A further alternative construction has the ports 28 and 12 arranged to open before the bores 20 and to supply air for starting. It is evident that the casing 11, or at least those portions of it carrying the bores 20 and the bracket 24, could be made movable and the valve member 14 made stationary by a simple reversal of functions, for example by securing the member 14 to the plate 13.

It will be appreciated that the burner shown in detail in Figures 1 and 2 may be replaced by one of a different type as indicated above, for example a burner as described in the specification of said prior application, Serial No. 320,083.

Spray drying apparatus is another example of apparatus which may advantageously be constructed in accordance with the present invention.

*Example*

A burner constructed according to the invention as shown in Figures 1 and 2, gave the following results when operated with the same oil at seven different flow rates:

| Flow in gallons per hour | Spray cone angle |
| --- | --- |
| 27.1 | 77° |
| 37.0 | 74° |
| 62.8 | 79° |
| 199 | 71° |
| 219 | 72° |
| 231 | 73° |
| 235 | 74° |

In these runs the supply pressure was held constant at 200 lbs. per sq. in. gauge by means of a relief valve. The data show that a variation in the oil flow rate in excess of eight to one resulted in a reduction in the spray cone angle of only 3°, while the maximum variation in angle was only 6°. For comparison, it may be noted that in the usual swirl type atomizer having ports disposed at right angles to the housing wall the variation in spray cone angle is between 39° and 40° over a smaller range of oil flow rates, namely, about five to one.

I claim as my invention:

1. In a vortex device, the combination of a pair of hollow, concentric, contiguous, relatively rotatable walls defining therein a vortex chamber, the outer of said walls having a set of inlet bores substantially tangential to said chamber and the inner of said walls having a set of ports positioned to register respectively with said bores and to be moved progressively out of register with said bores upon relative rotation between said walls, at least the parts of the inner wall defining the ports being thin in relation to the widths of said ports measured circumferentially along said wall, whereby the direction of flow of fluid entering said chamber through said bores and ports varies with the extent to which the said ports are in register with said bores; and means for effecting relative rotation between said walls.

2. The combination according to claim 1 wherein the said ports in the inner wall have their axes offset from the center of said vortex chamber so as to be substantially coaxial with the said bores in the outer wall when in complete register therewith.

3. A liquid atomizer having a vortex chamber constructed according to claim 1, and rear and front walls for said chamber, said front wall having an orifice, the said rear and front walls being in fixed relative relation, whereby the volume of said chamber remains constant for different angular relations of said concentric walls.

4. Apparatus for mixing a liquid and a gas by spraying the liquid into a gas in the general direction of gas flow, comprising a gas vortex chamber constructed in accordance with claim 1, a liquid atomizer situated within said chamber having means for admitting liquid thereto and an outlet directed to discharge liquid in the said direction.

5. Apparatus for mixing a liquid and a gas by spraying the liquid into a gas in the general direction of gas flow, comprising a gas vortex chamber constructed in accordance with claim 1, a liquid atomizer situated within said chamber having a vortex chamber constructed in accordance with claim 1, and rear and front walls, said front wall having an orifice directed to discharge liquid in the said direction.

6. In combination with the apparatus according to claim 5, means coupling together the said means for effecting relative rotation between the walls of the gas vortex chamber and the means for effecting relative rotation between the walls of the liquid vortex chamber, so that the said ports of both said inner walls move progressively and simultaneously into register with the said bores of their respectively contiguous outer walls.

7. In a vortex device, the combination of a whirl casing having a recess of circular cross section and a plurality of bores distributed about the perimeter of said recess and directed tangentially to a large circle having a diameter slightly less than the diameter of said recess and lying in a plane at right angles to the axis of said recess; a valve device having a tubular wall rotatably mounted in substantially fluid-tight relation to the said recess and a back wall, said back and tubular walls forming the bounding walls of a vortex chamber, said tubular wall having a set of ports positioned to register respectively with said bores and to be moved progressively out of register with said bores upon relative rotation between said valve device and said casing, at least the parts of said tubular wall defining the ports being thin in relation to the widths of said ports measured circumferentially along said wall, whereby upon rotation of the valve member and casing in relation to each other, fluid flow into the vortex chamber increases from a minimum to a maximum and also changes in direction becoming tangential to circles of increasing radii in a plane at right angles to said axis of the recess; and means for effecting relative rotation between said valve member and casing.

8. A liquid atomizer comprising, in combination: a tubular casing adapted to conduct liquid under pressure; a vortex device at one end of said tubular casing including a vortex device constructed as defined in claim 7 having the said bores of the casing in liquid-receiving communication with the tubular casing; and wall structure including a front wall for the said vortex chamber having a discharge orifice situated substantially at the said axis of the recess, the axial distance between said back wall and front wall being fixed, whereby the volume of said vortex chamber is constant as the fluid flow into the vortex chamber changes.

References Cited in the file of this patent

UNITED STATES PATENTS

| | | |
| --- | --- | --- |
| 1,087,768 | Hoffman | Feb. 17, 1914 |
| 1,180,907 | Coen | Apr. 25, 1916 |
| 1,706,316 | Norton et al. | Mar. 19, 1929 |
| 2,627,395 | Rivoche | Feb. 3, 1953 |
| 2,653,054 | Purchas et al. | Sept. 22, 1953 |
| 2,674,493 | Raskin et al. | Apr. 6, 1954 |